Jan. 9, 1962 C. P. VILLARS 3,016,528

NONLINEAR CONVERSION BETWEEN ANALOG AND DIGITAL SIGNALS BY A PIECEWISE-LINEAR PROCESS

Filed May 18, 1959 5 Sheets-Sheet 1

INVENTOR
C. P. VILLARS
BY R. B. Ardis
ATTORNEY

INVENTOR
C. P. VILLARS
BY R. B. Adis
ATTORNEY

ENCODING FLOW DIAGRAM

INVENTOR
C. P. VILLARS
BY R. B. Ardis
ATTORNEY

X IS CHOSEN FOR DESIRED APPROXIMATION; THEN:

$i_3 = \frac{1}{2}(i_{max} - X) = 2\,i_4$ $i_3^* = \frac{X}{2} = 2\,i_4^*$ $X_1$, $X_2$ AND $X_3$ ARE EACH CHOSEN FOR DESIRED APPROXIMATION; THEN:

$i_3 = \frac{1}{2}(i_{max} - X_3)$ $i_3^* = \frac{1}{2}(X_3 - X_2)$ $i_3^{} = \frac{1}{2}(X_2 - X_1)$ $i_3^{*} = \frac{1}{2}X_1$ INVENTOR
C. P. VILLARS
BY R. B. Ardis
ATTORNEY Jan. 9, 1962 C. P. VILLARS 3,016,528

NONLINEAR CONVERSION BETWEEN ANALOG AND DIGITAL SIGNALS BY A PIECEWISE-LINEAR PROCESS

Filed May 18, 1959 5 Sheets-Sheet 5

INVENTOR
C. P. VILLARS
BY R. B. Ardis
ATTORNEY

United States Patent Office 3,016,528

Patented Jan. 9, 1962

3,016,528

NONLINEAR CONVERSION BETWEEN ANALOG AND DIGITAL SIGNALS BY A PIECEWISE-LINEAR PROCESS

Claude P. Villars, Gillette, N.J., assignor to Bell Telephone Laboratories, Incorporated, New York, N. Y., a corporation of New York Filed May 18, 1959, Ser. No. 813,776

16 Claims. (Cl. 340—347)

This invention relates to digital transmission and, more specifically, to the nonlinear conversion of analog signals and digital signals, one to the other, by a piecewise-linear process.

The advantages of transmission by PCM (pulse code modulation), one increasingly important form of digital communication, over transmission by PAM (pulse amplitude modulation), a form of analog transmission, are well known in the art and will not be examined at length here. For a thorough exposition see, for example, the article "The Philosophy of PCM," by Oliver, Pierce, and Shannon, in volume 36, Proceedings of the I.R.E., pages 1324 to 1331 (1948); H. S. Black, "Modulation Theory," Van Nostrand (1933); and "Etude sur la Modulation par Impulsions Codées," by applicant, appearing in Bulletin Technique PTT (Post Telegraph and Telephone, a Swiss publication), pages 449 to 472 (1954). Suffice it to say that transmission of information by PCM offers many distinct advantages over other methods in that the information is digital in nature and may therefore be regenerated by repeaters judiciously deployed a'ong the transmission path. The regeneration process substantially eliminates the accumulation, in the course of transmission, of noise, crosstalk and other forms of signal degradation.

Prior to transmission, encoding (i.e., conversion of the original analog information to a pulse code) is necessary in a PCM system; and if the digital information thus transmitted is to be used in its original form, upon its reception decoding is necessary.

Before encoding the original information, it is necessary that it be quantized. In the quantizing process the exact value of the information at any instant is approximated by one of a number of discrete values commonly called quantum levels. The difference between the instantaneous value of the original information and the quantum level actually transmitted is called quantizing error and gives rise to what is known variously as quantizing noise or quantizing distortion. Quantizing distortion is especially objectionab'e and very often intolerable, when the instantaneous value of the original information is small, but is usually of no significance when the instantaneous value is large. For more effective transmission, it is therefore desirable to have more quantum levels available at low amplitudes of the signals in order to better define these amplitudes, thus reducing the relative quantizing error. Something is taken from the higher-valued amplitude signals and given to the lower-valued amplitude signals. Consequently, "companding" (a verbal contraction of the terms "compressing" and "expanding") may be advantageously used in a quantized-signal transmission system to balance the undesirable effects of quantizing error.

It is the dynamic range of the original information that is "compressed" in such a system. The dynamic range is reduced so that low amplitude samples of the original information are emphasized, i.e., effectively increased in amplitude, while the higher-valued amplitude samples are de-emphasized.

Companding therefore serves a special purpose in quantized transmission systems in that it reduces the magnitude of the quantizing error for low amplitude signals, where quantizing distortion wou'd be a serious matter, at the price of increased quantizing error for higher amplitude signals, where increased distortion can be tolerated. Restated broadly, the purpose of the PCM compander is to reduce the quantizing impairment of the original signal by, in effect, quantizing not on a uniform but on a nonuniform basis.

The usual companding system incorporates as its main components a compressor at the transmitter and an expander at the receiver. These components are normally separate units, the compressor being connected externally in tandem with the coder and the expander being connected externally in tandem with the decoder. See, for example, The Bell Sysem Technical Journal, January 1948, volume 27, page 1, in which L. A. Meacham and E. Peterson describe such a system.

PCM systems have been devised, however, that combine the processes of coding and compression at the transmitting end and the processes of decoding and expansion at the receiving end. Such a system is disclosed by R. L. Carbrey in a copending application, Serial No. 631,806, filed December 31, 1956, which has since issued as Patent No. 2,889,409. Exemplary of the Carbrey invention is the transmitting end of the system in which a nonlinear encoder automatically compresses its input signal as it carries out its coding operation. B. D. Smith discloses a method of nonlinear encoding by feedback methods in an article entit'ed "Coding By Feedback Methods" which appears in volume 41 of the Prceedings of the I.R.E., at page 1053.

While the methods of conversion between analog and digital information which have been disclosed by Carbrey and Smith have many advantages, the objects attained by the presently disclosed method, and the features and advantages thereof, constitute an important contribution to the field of PCM transmission.

It is for example, a principal object of the invention to permit a ready intertrading of companding advantage for greater economy wherever this expedient is called for.

Another illustrative object of the invention is to perform companding processes on a digital rather than on an analog basis, using pulse or ON-OFF techniques so that greater stability, ease of control, economy, and simplicity may be imparted to these processes.

In accordance with the invention, nonlinear conversion between analog and digital signals is accomplished by a piecewise-linear process. Consider, for example, the invention as embodied in the encoder. The input samples and output code of the encoder, though not linearly re'ated over the entire coding range, are constrained to be so related over subranges determined by the transition of predetermined digits in a permutation code of base *b* (the base used to illustrate the invention is the base two).

The digit transitions define breakpoints in a piecewise-linear compression characteristic. Each segment of the characteristic defines a linear relation between a specified range of analog signal magnitude and a corresponding range of digital code. The linear relation or "scale factor" defined by each segment in a particular quadrant is peculiar to that segment. The "scale factor" of a segment is here defined as the slope of the segment and is to be distinguished from the "compression ratio" of a continuously nonlinear characteristic. The compression ratio may be defined as the ratio of the slope of the continuously nonlinear characteristic at the origin of the plot to the slope of the corresponding linear characteristic passing through the origin.

It is a feature of the piecewise-linear system disclosed here that it can be used to approximate almost any type of nonlinearity and yet retain some of the simplicity of linear systems.

The invention will be better understood from the following detailed description given in connection with the appended drawings in which.

For the sake of brevity and simplicity the present disclosure will concern the application of the principles of the invention to the encoding process only. This expedient is believed justified, since it is well known that principles applicable to encoding are equally applicable in a straight-forward manner to the reverse process of decoding. Also, for ease of narration and understanding, the embodiment illustrated in FIG. 1 has been considerably simplified in that it converts analog information on a piecewise-linear basis to only a four-digit code, and has an encoding characteristic (see FIG. 4) having simply one breakpoint or two linear segments per quadrant. It should be understood, however, that in the p-actice of the invention the code may consist of any number of desired digits, the number being limited only by other considerations. The number of breakpoints which is used is determined not by any limitations of the invention, but rather by the degree with which a specified nonlinear characteristic is desired to be approximated.

In the description of the illustrative embodiment of FIG. 1, reference will be made at appropriate times to FIGS. 2, 3 and 4 as aids in understanding the process occurring in the circuit of FIG. 1.

Figure 1:
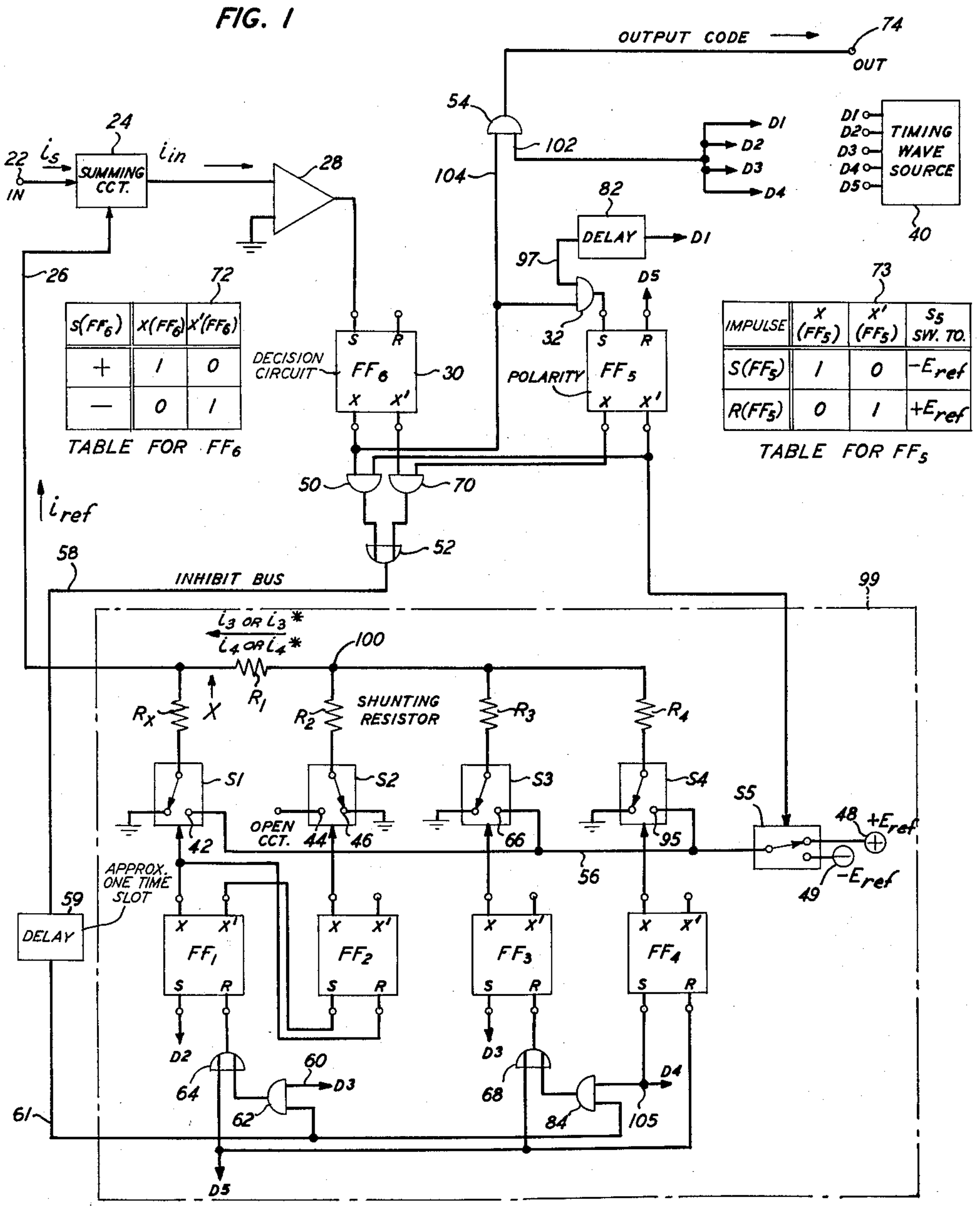
FIG. 1 is a block schematic diagram depicting a piecewise-linear encoder which embodies the invention.
Figure 2:
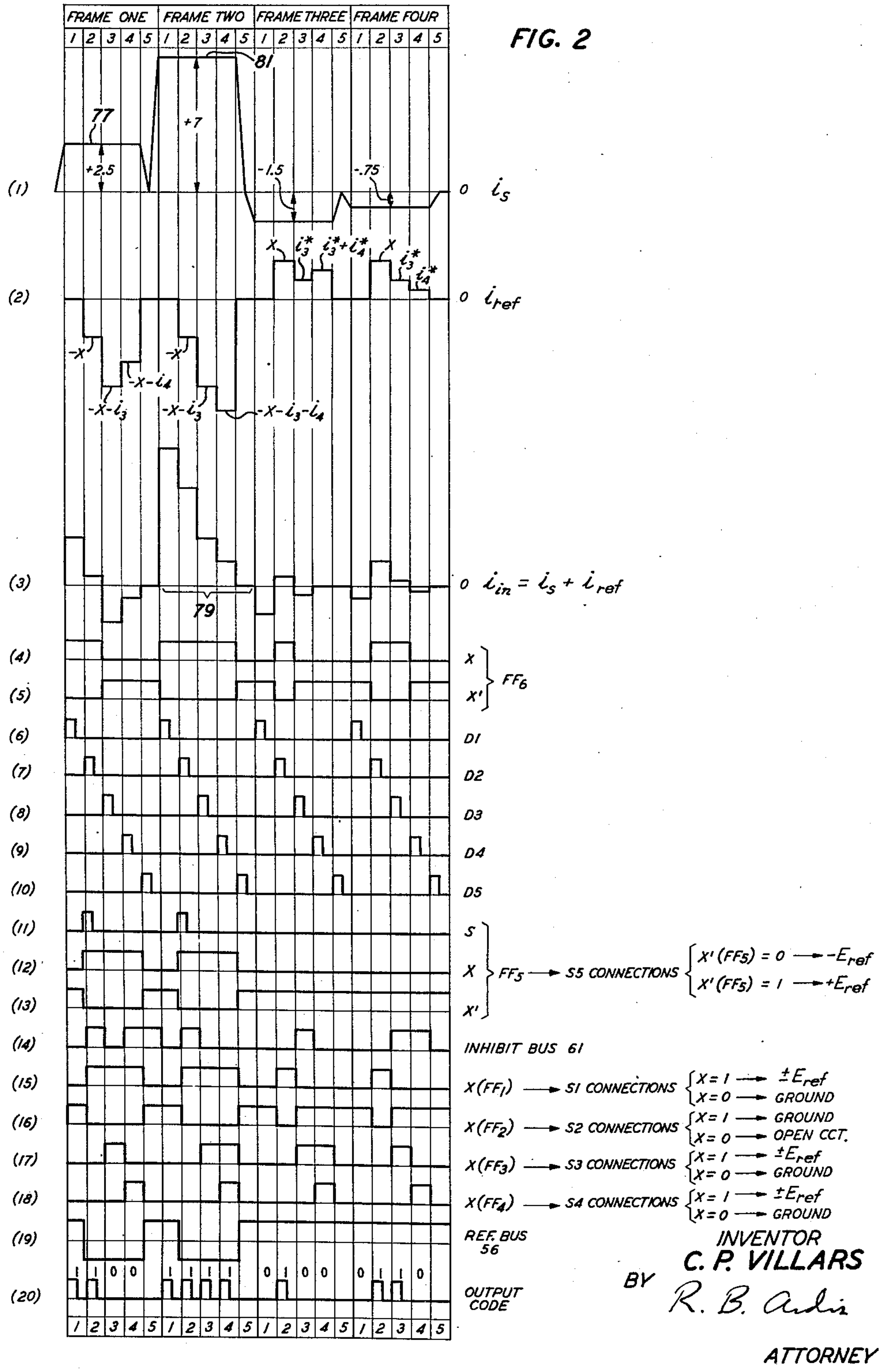
FIG. 2 is a plot of waveforms illustrating the operation of the embodiment of FIG. 1.

In FIG. 1 a message current $i_s$, plotted in FIG. 2(1), is supplied to the input terminal 22 and thence to the summing circuit 24. The summing circuit 24 combines the message current $i_s$ with a reference current $i_{ref}$, supplied by way of input lead 26. The manner in which the reference current $i_{ref}$ is generated will be thoroughly explored. It should be noted now, however, that $i_{ref}$ is desired to be of opposite sign in respect to the polarity of the message current $i_s$ with which it is to be combined.

*Function of elements*

The function of the various elements of FIG. 1 will now be exolained. The summing circuit 24 takes the sum of the input message current $i_s$, supplied by way of the input terminal 22, and the reference current $i_{ref}$, supplied by way of the input lead 26, and conveys this sum to the amplifier 28. The resultant sum, the current $i_{in}$, is shown as waveform (2) in FIG. 2. The functions of the summing circuit 24 and the amplifier 28 may be combined in a summing amplifier. In its amplified form, $i_{in}$ is then supplied to the input terminal $s$ of decision circuit 30.

Decision circuit 30 is a Schmitt bistable or flip-flop circuit having unity loop gain, and is here denoted as $FF_6$. The stimuli which affect the state of $FF_6$ are tabulated in table 72 of FIG. 1. The state of $FF_6$, it will be noted, is determined by the polarity of its input terminal $s$. This will be discussed at length in the description which follows. For an unusually thoroughgoing article on the Schmitt circuit, see G. L. Swaffield's article, "The Schmitt Multivibrator," which appears at page 344 of the July 1958 issue of Wireless World.

Though flip-flops $FF_1$ to $FF_6$ are shown in identical flip-flop convention, it should be understood that $FF_6$ is different in its purpose and function, and consequently in structure, from all the other flip-flop circuits of FIG. 1, namely, flip-flops $FF_1$ to $FF_5$. Each of the latter flip-flops is of the conventional Eccles-Jordan type. As to each of the latter, when either of its input terminals $s$ and $r$ is impulsed, it will remain in the state determined by the impulse until such time as the other terminal is impulsed. In other words, as to flip-flops $FF_1$ to $FF_5$, a constantly present stimulus is not required to maintain either of the two possible states of equilibrium. Each of the output terminals $x$ and $x'$ may be in either of two states, a "0" or "1," depending on the state of the other output terminal. The binary terms "1" and "0" are used respectively to indicate the presence or absence of a stimulus or impulse. Thus, when any of the $x$ output terminals is in the "0" state, its associated $x'$ output terminal is in the "1" state.

It will be assumed that the terminals $x$ and $x'$ of the various flip-flop circuits of FIG. 1 are in a certain state at the beginning of each code group and, hence, of the process now to be discussed. Thus we will assume that while the embodiment of FIG. 1 is at rest, all the $x$ terminals of the flip-flop circuits, with the exception of $FF_2$, are in the "0" state and, consequently, the terminals $x'$ are in the "1" state.

In each of the flip-flop circuits the terminals $s$ and $r$ represent input terminals to which stimuli are supplied and the terminals $x$ and $x'$ represent the output terminals from which stimuli are derived. The input terminal $s$ may be thought of as the "set" terminal; and the terminal $r$ may be though of as the "reset" terminal, in that the latter terminal returns the flip-flop circuit to its rest state.

It can be seen from a consideration of table 72 that when the input terminal $s$ of $FF_6$ is at a positive potential, i.e., when the current $i_{in}$ is positive, the states of the output terminals $x$ and $x'$ will be respectively "1" and "0." When, on the other hand, the terminal $s$ of $FF_6$ is at a negative potential, the states of the output terminals $x$ and $x'$ are respectively "0" and "1."

It should be noted that when any AND or OR gate terminal or any switch enabling lead is connected to a circuit point in the "1" state, the terminal or lead will be enabled.

The subsequent discussion will be facilitated, if, instead of referring to the output terminal $x$ of a particular flip-flop, say $FF_6$, as "the output terminal $x$ of flip-flop circuit $FF_6$," this terminal is referred to simply as "terminal $x(FF_6)$."

As was already mentioned above, the polarity flip-flop $FF_5$ and the switch-enabling flip-flops $FF_1$ to $FF_4$, unlike the decision flip-flop $FF_6$, are of the conventional Eccles-Jordan type. It can be seen from a consideration of table 73 in FIG. 1 that when the input terminal $s(FF_5)$ is impulsed, i.e., when the AND gate 32 is enabled, the output terminals $x(FF_5)$ and $x'(FF_5)$ are respectively in the "1" and "0" states. When terminal $x'(FF_5)$ is in the "0" state, it can also be seen that the switch S5 is switched to the negative reference potential source 49. It is not necessary that the stimulus supplied to the input terminal $s(FF_5)$ by the output lead of AND gate 32 be maintained in order that the above-mentioned state of polarity flip-flop $FF_5$ remain unchanged. When the input terminal $r(FF_5)$ is impulsed, the states of terminals $x(FF_5)$ and $x'(FF_5)$ will be respectively "0" and "1" and the switch S5 will be switched to the positive source of reference potential 48.

Each of the flip-flop circuits $FF_1$ to $FF_4$ is a switch-enabling element, as is $FF_5$. Flip-flops $FF_1$ to $FF_4$ are used to control switches S1 to S4, respectively. The output terminals $x$ and $x'$ of each of these flip-flops, excepting $FF_2$, are respectively in the "0" and "1" states when the flip-flops are at rest, i.e., at the commencement of any frame or code group (see FIG. 2). When the state of any of the flip-flops $FF_1$ to $FF_4$ is changed from its rest condition by an impulse supplied to its input terminal $s$, the state of its output terminal $x$ will be a "1" and its associated switch will be switched from ground to the reference current bus 56 in the case of switches S1, S3 and S4, and from open circuit to ground in the case of switch S2. When the state of each of the $x$ terminals of flip-flops $FF_1$, $FF_3$ and $FF_4$ is a "0," the switches S1–S4 will be positioned as shown in FIG. 1. It will be noted that when this condition obtains, the output terminal $x(FF_2)$ is in the "1" state. Conversely, when the state of each of the $x$ terminals of flip-flops $FF_1$, $FF_3$, and $FF_4$ is a "1," the switches S1–S4 will be positioned oppositely to the manner shown in FIG. 1. Note that the output terminal $x(FF_2)$ will then be in the "0" state.

FIG. 1 depicts the AND and OR gates in conventional fashion. The AND gates are each represented by a closed arc, the output lead of the gate extending from the midpoint of the arc and the input leads being connected to the chord of the arc. See, for example, AND gate 50. The OR gates are also represented by a closed arc but are distinguishable from the AND gates in that the input leads extend through the chord of the arc to the arc. See, for example, OR gate 52. Thus in the convention used here, a gate is an OR gate when its input leads are shown to extend through the chord of the arc to the arc and is an AND gate when its input leads extend only to the chord of the arc. As is well known, enablement of an AND gate requires universal concurrence of stimuli at its input leads. Thus, for example, enablement of AND gate 50 requires the concurrence of stimuli or "1's," from $x(FF_6)$ and $x'(FF_5)$. Enablement of an OR gate, on the other hand, may be accomplished by supplying a stimulus to any of its input leads. Thus, for example, OR gate 52 will be enabled when either of AND gates 50 and 70 is enabled.

The timing wave source 40 supplies impulses to various points in the circuit of FIG. 1. The impulses are supplied periodically. In FIG. 2(6), for example, it can be seen that the output terminal $D_2$ of timing wave source 40 supplies an impulse in the second time slot of each frame. Timing circuit 40 may be any of the many suitable timing signal generators so well known in the art. It may, for example, be of the type disclosed at page 52 in volume 32 of Electronics (March 6, 1959), a McGraw-Hill publication.

Figure 4:
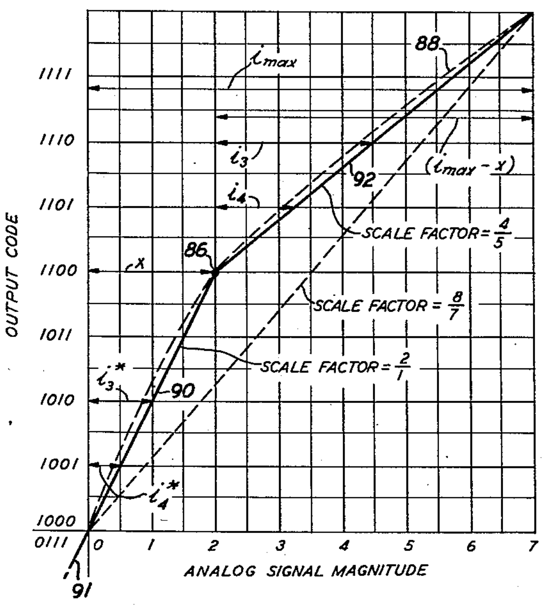
FIG. 4 shows the piecewise-linear encoding characteristic of the embodiment of FIG. 1.

The functions and relationships between the resistors switched into and out of connection with the summing circuit input lead 26 by switches S1 to S4 are more easily understood after a consideration of FIG. 4. FIG. 4 fully shows that portion of the encoding characteristic of the embodiment of FIG. 1 that lies in the first quadrant. The other half of this characteristic would lie in the third quadrant, which is not fully shown in FIG. 4. The first segment of the third quadrant, the segment 91, is shown partially. The characteristic, in accordance with the invention, is piecewise-linear and is shown in its simplest form, in that it has but one breakpoint 86. Note that the characteristic approximates the continuously nonlinear characteristic 88.

Each linear segment of the piecewise-linear characteristic has its own peculiar scale factor. As was mentioned previously, the "scale factor" of a segment is the slope of the segment. The scale factor of segment 90, for example, may be determined as follows. At the breakpoint 86 the quantum level represented by the code 1100 is +4 and the coordinate analog signal magnitude is +2. Thus, the scale factor of segment 90 is 2.0. By the same reasoning, the scale factor of segment 92 is equal to ⅖.

Each linear segment of the characteristic defines a subrange of the peak-to-peak encodable analog signal excursion. Thus, segment 90 encompasses analog signal magnitudes lying between 0 and +2. It should be understood that the breakpoint 86 need not occur where shown. The locus of the point is determined by the value of the current X, which is arbitrarily chosen for any desired approximation. Moreover, the breakpoint 86 need not occur at the transition from 0 to 1 of the second most significant digit—the order of significance being from left to right—but may be chosen to occur at the transition of the third or even the fourth most significant digit. Therefore, before passing on to a further consideration of the invention, the reader should understand that the illustrative embodiment of FIG. 1 and its encoding characteristic, as shown in FIG. 4, are intended as very simple illustrations of the invention.

The arrangement of the resistors in FIG. 1 is applicable only to a 4-digit code in which the first digit determines the polarity of the signal and the next most significant digit determines the breakpoint of the coding characteristic in either the first or third quadrant. The value of the resistor $R_X$ is arbitrarily chosen to determine the location of the breakpoint 86. The current flowing through $R_X$ has been denoted simply as X, since it is an independent and arbitrarily chosen quantity. Note that if the piecewise-linear characteristic breaks at more than one point in each quadrant, there will be correspondingly more resistors of the type exemplified by $R_X$ and that these additional resistors will define the loci of the additional breakpoints. Thus, if more breakpoints were desired, we could have the independent and arbitrarily chosen quantities $X_1$, $X_2$, $X_3$, and so forth (see FIG. 5).

The combination of resistors $R_1$ and $R_2$ will give the desired change of scale factor when the breakpoint 86 is reached. It can be seen in FIG. 4 that when the logic elements of FIG. 1 have determined that the message current $i_s$ lies within one of the subranges encompassed by the linear segments 90 and 92, that an appropriate scale factor must be used. A change of scale factor in the simple illustrative embodiment of FIG. 1 is ultimately accomplished by resistor $R_2$. When switch S2 is switched to ground and the reference current lead 26 is connected to either of the reference potential sources 48 and 49, the encoder has determined that the message current $i_s$ lies within the subrange encompassed by segment 90. It can be seen in FIG. 1 that when the encoder is in its rest position, as shown, that the reference current lead 26 is connected to neither of the reference potential sources 48 and 49.

It is well to notice that reference currents fed through $R_3$ and $R_4$ are ultimately fed into a low impedance summing point represented by summing circuit 24. This summing point may be considered as essentially at ground. If, therefore, resistor $R_1$ were not positioned serially, as shown, then the effectiveness of $R_2$ as a shunt path to reduce the amount of reference current fed to summing circuit 24 would be greatly reduced, since the currents $i_3$, $i_3^*$, $i_4$ and $i_4^*$ would then prefer the above-mentioned summing point, virtually excluding the path presented by $R_2$. In other words without $R_1$, reference currents fed from $R_3$ and $R_4$ would avoid $R_2$ in favor of the much lower impedance represented by summing circuit 24.

As was already mentioned, resistor $R_X$ is chosen to approximate a desired nonlinear characteristic. The current X, flowing through resistor $R_X$, establishes the breakpoint 86 of the piecewise-linear characteristic. Now, in order to render the relationship between currents within each of the linear segments 90 and 92 a binary relationship, it is necessary that all resistors other than $R_X$, $R_1$ and $R_2$ be related to each other in powers of two and be chosen to conform to the established breakpoint 86. In the simplified embodiment of FIG. 1, the "other" resistors are $R_3$ and $R_4$. Refer to FIG. 1. The value of $R_3$ is chosen so that the current $i_3$, as it is fed into the summing circuit input lead 26, has the following value:

$$i_3=\frac{1}{2}(i_{max}-X)$$

where $i_{max}$ is the maximum encodable positive excursion of the message current $i_s$. The value of resistor $R_4$ is then chosen so that $$i_4 \text{ equals } \frac{i_3}{2}$$

In other words, the value of resistor $R_4$ is twice that of resistor $R_3$.

If the code used were to consist of more than four digits, additional resistors of the type exemplified by $R_3$ and $R_4$ would be added and similarly incorporated in the circuit. The additional resistors, say $R_Y$ and $R_Z$, would be binarily related to resistors $R_3$ and $R_4$. Thus, the hypothetical resistors $R_Y$ and $R_Z$ and the resistors $R_4$ and $R_3$ could bear the relationship $(R_Y:R_Z:R_4:R_3)$ as (8:4:2:1).

The value of $R_2$ is not arbitrarily chosen. The scaled-down counterparts $i_3$* and $i_4$* of the currents $i_3$ and $i_4$ are supplied to summing circuit 24 only when the resistor $R_2$ is connected to ground. When $R_2$ is so connected, it shunts to ground a predetermined amount of any current which is being supplied by way of $R_3$ or $R_4$. The shunting resistor $R_2$ is therefore chosen so that the scaled-down, star (*) values $i_3$* and $i_4$* of the binary-related currents $i_3$ and $i_4$ divide the current axis of the first segment from the origin—the segment 90—in binary fashion, just as $i_3$ and $i_4$ binarily divide the current axis of segment 92. $R_2$ is thus chosen so that it preserves the binary ratio between $i_3$ and $i_4$ on a scaled-down basis to conform to the subrange defined by segment 90. Stated mathematically, the value of $R_2$ is chosen so that:

$$\frac{i_3}{i_3*}=\frac{(i_{max.}-X)}{X}$$

In more general terms, each of the binary weighted currents $i_3$ and $i_4$ is to its respective scaled-down counterpart $i_3$* and $i_4$* as $$\frac{(i_{max.}-X)}{X}$$

Note well, however, that the above-stated general relationship between the non-star and star currents is valid only for the very simplified piecewise-linear characteristic illustrated in FIG. 4, i.e., it is valid only for piecewise-linear characteristics having one breakpoint per quadrant.

It can be seen, then, that when the value of $R_2$ is chosen as explained above, $$i_3*=\frac{X}{2}=2i_4*$$

The current axis of segment 90 is thus broken up in binary fashion by the various possible combinations of the star (*) currents $i_3$* and $i_4$*. An example of the generation of one of these various possible combinations will be given. If at a particular time the message current $i_s$ is such that it is necessary to generate the star (*) currents $i_3$* and $i_4$*, the switch S2 will connect the shunting resistor $R_2$ to ground, and resistors $R_3$ and $R_4$ will be connected to the reference current bus 56 by switches S3 and S4, respectively.

It should now be apparent in the illustrative embodiment chosen to describe the invention, that it is necessary for the generation of any star (*) current that the resistor $R_X$ and the shunting resistor $R_2$ both be connected to ground. In the illustrative embodiment of FIG. 1, the resistors $R_X$ and $R_2$ are connected to ground during the first and fifth time slots of any code group (see FIG. 2) and are connected to ground at other times only when the generation of star (*) current is necessary. It should be noted that when any of the star (*) currents is needed as a component of the reference current $i_{ref}$, that the current X, which defines the whole of the subrange of which the star (*) currents are components, will not be generated. This explains the reason why resistor $R_X$ is grounded, i.e., taken off bus 56, whenever the generation of star currents is required. The manner in which the various currents are generated will be clear when the operation of the illustrative embodiment of FIG. 1 has been explained. This explanation using representative values of the message current $i_s$, will be given later in the specification.

Although the resistors $R_3$ and $R_4$ are alternately switched from ground to the reference current bus 56, this does not affect the constancy of the currents $i_3$, $i_4$, $i_3$*, and $i_4$*. For example, the value of $i_3$ is not dependent on whether the resistor $R_4$ is connected to ground or to the reference current bus 56. This will readily be seen by considering the Thevenin equivalent circuit, looking back from juncture 100, for each possible combination of connections of $R_3$ and $R_4$.

Figure 3:
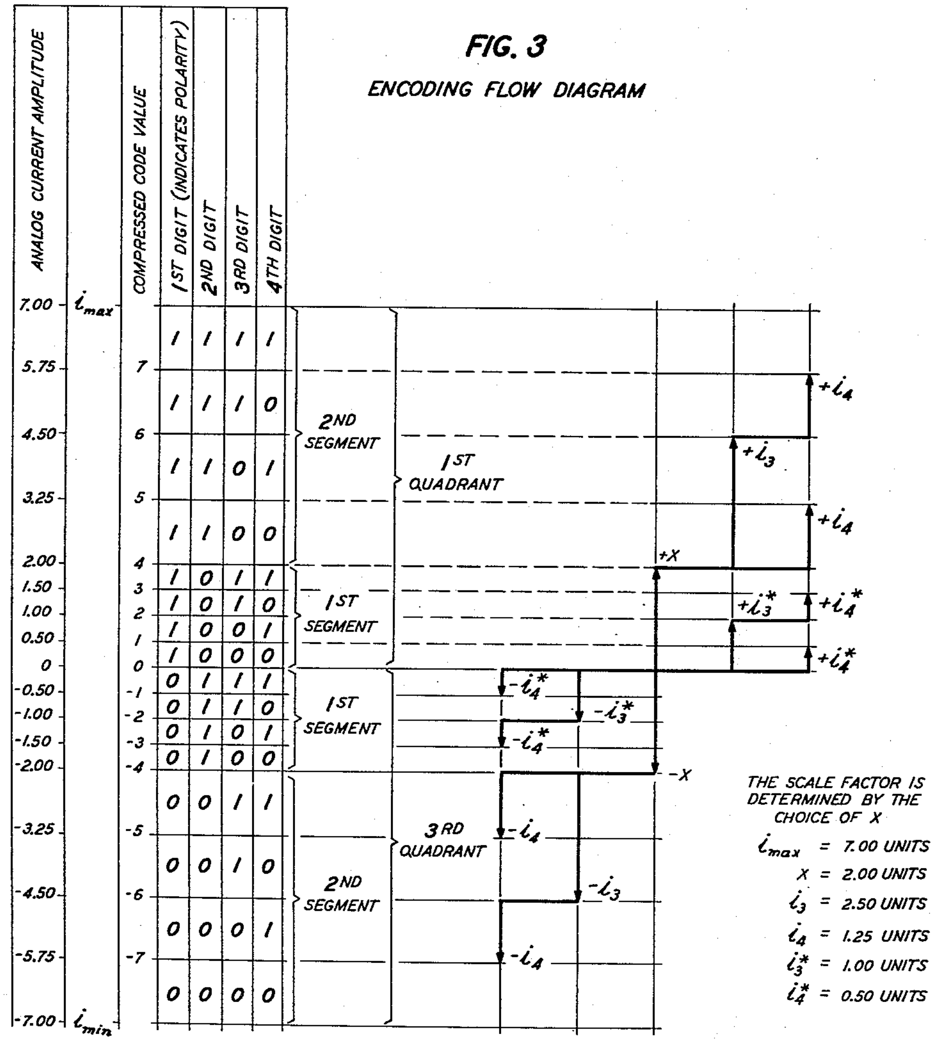
FIG. 3 is a so-called encoding flow diagram, also illustrating the operation of the embodiment of FIG. 1.

The relationships between the currents $i_{max}$, X, $i_3$, $i_4$, $i_3$*, and $i_4$* will perhaps be more meaningful if these currents are expressed numerically in the units of analog signal amplitude used in FIG. 3. Assume, then, that $i_{max}=7.0$ units of current. Assume, further, that the breakpoint 86 of the piecewise-linear characteristic of FIG. 4 is chosen so that $X=2.0$ units. Then:

$$i_3=\frac{1}{2}(i_{max}-X)=\frac{1}{2}(7-2)=2.50 \text{ units}$$

$$i_4=\frac{i_3}{2}=1.25 \text{ units}$$

$$i_3*=\frac{X}{2}=1.00 \text{ unit}$$

and $$i_4*=\frac{X}{4}=0.50 \text{ unit}$$

Note the relationship between each code value used in FIG. 3 and the corresponding analog current amplitude. Within each segment this relationship defines the scale factor of the segment. The compression of the dynamic range of the message current $i_s$ is thus apparent. For example, the code 1100 (having a code value of +4) is used to represent a message current amplitude of +2. The scale factor of the first segment (segment 90 of FIG. 4) is therefore two $$\left(\frac{4}{2}=2\right)$$

As another example, consider the code 1110 which has a code value of +6 and is used to represent a message current amplitude of +4.50. This relationship is defined by the second segment, segment 92 of FIG. 4. The scale factor of the segment is therefore four fifths $$\left(\frac{6-4}{4.50-2.00}=\frac{4}{5}\right)$$

As an example of just one variation from the very simple illustrative embodiment of FIG. 1, suppose—while still retaining a single breakpoint per quadrant—that a 5-digit code were used. Then another resistor, say $R_0$, would be required after $R_4$. Since only one breakpoint has been assumed, only one arbitrarily chosen resistor is needed. Hence, $R_X$ may be retained. In this hypothetical example, the following relationships would hold true:

$$i_3=\frac{1}{2}(i_{max}-X)=2i_4={}^4i_0$$

$i_0$ being the current which would pass through the newly added resistor $R_0$. Then the following relationships would also hold true:

$$i_3{}^*=\frac{X}{2}$$

$$i_4{}^*=\frac{X}{4}$$

$$i_0{}^*=\frac{X}{8}$$

From the above relationships it can be seen that the addition of further digits to the code will result in a finer binary breakdown of each subrange of the piecewise-linear characteristic.

*The encoding process*

The operation of the simplified embodiment of FIG. 1 will now be described. In the description which follows, reference will frequently be made to the timing diagram of FIG. 2 and the encoding flow diagram of FIG. 3. As previously alluded to, the plot of waveforms in FIG. 2 is divided into periodically recurrent time frames, each consisting of five time slots which accommodate one code group. Each time slot is therefore also periodically recurrent. Though the illustrative encoder of FIG. 1 generates a 4-digit code, five time slots are provided. The fifth time slot is employed so that the output terminal $D_5$ of timing circuit 40 may reset the terminals $x(FF_1)$, $x(FF_3)$, and $x(FF_4)$ to "0" before each frame begins. Note that terminal $x(FF_1)$ in turn resets the terminal $x(FF_2)$. It is not necessary, however, that a fifth time slot be used. For example, it is not uncommon to provide a so-called guard space between each time slot. When such a space is provided, the interval between the last time slot of a time frame and the first time slot of the immediately following frame may be used to serve the purpose of applicant's fifth time slot.

It is appropriate to note that the switching impuses of FIG. 2 need not be entirely positive. As a practical matter they are, in fact, usually negatively biased. This expedient will ordinarily result in better switching of elements such as diodes and transistors.

As was previously mentioned, the operation of the encoder of FIG. 1 is regulated with respect to time by the timing circuit 40. Each of the output terminals of timing circuit 40 is connected to various points in the encoder to provide impulses in synchronism with the occurrence of a particular time slot. Thus, for example, the output terminal $D_1$ of timing circuit 40 will provide an impulse to AND gate 54 upon each occurrence of time slot 1.

The other aid indescribing the operation of the encoder of FIG. 1, namely the encoding flow diagram of FIG. 3, consists of two parts. The left-hand portion of the diagram is a tabulation of a binary code representing the units of amplitude of the message current $i_s$. As previously mentioned, each element of the code may be either a "1" or "0". In each code group the elements are written from left to right in descending order of significance, i. e., the most significant digit is furthermost to the left. It indicates the polarity of the message current $i_s$. When the message current $i_s$ is positive, the polarity digit will always be a "1" and when this current is negative the polarity digit will always be a "0".

For example, as can be seen in FIG. 3, if the amplitude of the message current $i_s$ equals +4.5 units, the code which will be used to represent this amplitude will be 1101. Since the code group 1101 has a code value of 5, the compression of the dynamic range of the message current $i_s$ is apparent. On the other hand, if the amplitude of the message current $i_s$ is −4.5 units, the code group used to represent this amplitude is the "prime" of the code group used to represent +4.5 units. Thus, −4.5 units is represented by the code group 0010.

When a code group is "primed" each element of the group is changed to its binary opposite. This can be seen from a comparison of the code groups representing +4.5 units and −4.5 units. The functions of the "1" and the "0" in a code are thus reversed in a corresponding "prime" code. In the illustrations chosen, for example, 1101 has a code value of $+(2^2+0+2^0)$ or +5 code units, whereas the code group 0010, the "prime" of 1101, has a code value of $-(2^2+0+2^0)$ or −5 code units. It should be understood, therefore, that a "prime" method of differentiating between positive and negative code values is used in FIG. 3. This method should be distinguished from the often-used "reflected" method of differentiation in which the tabulation for negative values is, with the exception of the first digit, an image, as it were, of the tabulation for positive values.

The right-hand portion of the encoding flow diagram of FIG. 3 illustrates the process by which the amplitude of the message current $i_s$ at any instant of time is approximated by a summation of the components of reference current $i_{ref}$. That negative values of the reference current $i_{ref}$ and negative values of the code lie across from each other, as do the respective positive values, should not be construed to mean that if the message current $i_s$ is negative that negative values of the reference current $i_{ref}$ shall be employed. On the contrary, when the message current $i_s$ is positive, it is desired that the reference current $i_{ref}$ be negative in the trial and error process by which the amplitude of the message current $i_s$ is approximated by the digital code. Now that FIGS. 2 and 3 have been explained, the operation of the illustrative embodiment of FIG. 1 may be approached with greater understanding.

It will be much more meaningful if representative numerical amplitudes of the message current $i_s$ are used in the discussion which follows than if the operation of the circuit is approached in the abstract.

*Hypothetical case I*

As a first example, it will be assumed that the message current $i_s$ is equal to +7.0 units of analog current amplitude. The operation of the encoder for such a value of message current is illustrated by those portions of the 20 waveforms of FIG. 2 lying within frame two. Thus, portion 81 of the message current $i_s$ in FIG. 2(1) is equal to +7.0 units.

At the commencement of time slot 1, no reference current $i_{ref}$ is fed into the summing circuit 24. This is because the reference current lead 26 is not connected to the reference current bus 56 by any of the switches S1, S3, and S4. The input current $i_{in}$ of amplifier 28 therefore represents the message current $i_s$ only. Since $i_s$ is positive, the potential of the input terminal $s(FF_6)$ will be positive. Consulting Table 72, the reader will note that when $s(FF_6)$ is positive, the output terminals $x(FF_6)$ and $x'(FF_6)$ are respectively in the "1" and "0" states.

Also at the commencement of time slot 1, the states of the output terminals $x(FF_5)$ and $x'(FF_5)$ are respectively "0" and "1." Consulating the Table 73, which illustrates the operation of the polarity flip-flop FF5, the reader will note that when $x'(FF_5)$ is in the "1" state that the polarity switch S5 connects the reference current bus 56 to the positive source of reference potential 48. The inputs of AND gates 50 are connected to the terminals $x(FF_6)$ and $x'(FF_5)$. Since these terminals are both in the "1" state at the commencement of time slot 1, AND gate 50 will be enabled. The OR gate 52 will in turn be enabled, thus enabling the inhibit bus 58.

There is a concurrence of impulses at the inputs of AND gate 54 from the terminal $x(FF_6)$ and the terminal $D_1$ of timing wave source 40. Hence, AND gate 54 is enabled and the first digit of the code group which will represent the amplitude of the message from $i_s$ is produced at the output terminal 74. Because AND gate 54 was enabled, this digit is a "1." Being the most significant digit, it indicates that the message current $i_s$ is positive (see FIG. 3). Of the five terminals $D_1$ to $D_5$ of timing wave source 40, $D_1$ is the only one which supplies an impulse during time slot 1.

During time slot 1, the flip-flops $FF_1$, $FF_3$, and $FF_4$ are in their rest states, as will be seen. The output terminals $x$ and $x'$ of each of these flip-flops are respectively in the "0" and "1" states. Switches S1, S3 and S4 are thus all switched to ground, since their associated $x$ terminals are each in the "1" state. The reference current bus 56 is therefore disconnected from the summing circuit input lead 26.

The rest condition of the reference current circuit 99 during time slot 1 will now be explained. As was mentioned previously, the inhibit bus 58 has been enabled by AND gate 50 and, consequently, by OR gate 52. During time slot 1, however, enablement of the inhibit bus 58 is of no consequence since the output terminals $x(FF_1)$ and $x'(FF_1)$ are already in their rest states "0" and "1," respectively. Moreover delay circuit 59, which has a delay period substantially equal to one time slot, depending upon the cumulative delay experienced in other elements of the circuit, will postpone the inhibitive effect of bus 58 until time slot 2 of frame two. Since $x(FF_1)$ is in the "0" state, the switch S1 is connected to its ground terminal as shown. No current flows from the reference current bus 56 through $R_X$ and thence into the summing circuit 24. The current X is therefore zero.

Since the terminal $s(FF_2)$ is connected to the terminal $x'(FF_1)$, which terminal is at present in the "1" state, the output terminal $x(FF_2)$ is in the "1" state and the switch S2 is enabled, connecting shunting resistor $R_2$ to ground. Though shunting resistor $R_2$ is now connected to ground, it is nevertheless of no effect in producing the star (*) currents previously mentioned, since no current flows into junction 100 during the time slot 1.

Again, the fact that the inhibit bus 58 is enabled has no effect on the state of flip-flop $FF_3$, since AND gate 84 is not enabled unless impulses are concurrently supplied from the output terminal $D_4$ of timing wave source 40 and from inhibit bus 61. Nor is OR gate 68 enabled unless an impulse is supplied from either AND gate 84 or the output terminal $D_5$ of timing wave source 40. Furthermore, the input terminal $s(FF_3)$ will not be enabled until an impulse is supplied from the output terminal $D_3$ of timing wave source 40. The state of output terminal $x(FF_3)$ is therefore "0", switch S3 is at rest in its ground position, and the resistor $R_3$ is not connected to the reference current bus 56. Thus, neither of the currents $i_3$ and $i_3$* is supplied during time slot 1.

As in the case of flip-flop $FF_3$, the input terminals $s$ and $r$ of $FF_4$ are presently both in the "0" state and, consequently, the terminals $x(FF_4)$ and $x'(FF_4)$ are respectively in the "0" and "1" states. Switch S4 is therefore in its rest position and resistor $R_4$ is connected to ground. Neither of the currents $i_4$ and $i_4$* is supplied at this time. The reference current $i_{ref}$ is therefore zero.

The following operations take place during time slot 2: As will be seen, the resistor $R_X$ is connected by switch S1 to the reference current bus 56 and, in turn, to the negative source 49 so that the current X now flows into summing circuit 24. The current X, as can be seen in FIG. 3, has an amplitude of negative 2.0 units, and when it is added to the 7.0 units of amplitude of the message current $i_s$, the resultant current $i_{in}$ is equal to +5.0 units. Accordingly, the potential at $s(FF_6)$ remains positive and the states of the output terminals $x(FF_6)$ and $x'(FF_6)$ remain respectively "1" and "0".

A very short period of time before the commencement of time slot 2, the input lead 97 of AND gate 32 is impulsed by an impulse which was supplied to delay circuit 82 by the terminal $D_1$ of timing circuit 40 during the first time slot.

The delay provided by delay circuit 82 in effect presets polarity flip-flop $FF_5$ which, in turn, insures that $i_{ref}$ will be of proper polarity at the commencement of time slot 2. Since the output terminal $x(FF_6)$ was also in the "1" state at the time input lead 97 of AND gate 32 was impulsed, the input terminal $s(FF_5)$ was impulsed at that time. Consult table 73 which relates to the polarity flip-flop $FF_5$. When $s(FF_5)$ is impulsed, the output terminals $x(FF_5)$ and $x'(FF_5)$ are respectively in the "1" and "0" states and the switch S5 is switched to the negative source of reference potential 49.

Since the terminals $x(FF_6)$ and $x'(FF_5)$ are not concurrently in the "1" state during time slot 2, AND gate 50 is disabled during this interval. AND gate 70 is also disabled since the terminals $x'(FF_6)$ and $x(FF_5)$ also are not concurrently in the "1" state during time slot 2. Inhibit bus 58 is therefore disabled. The switch S1, which was previously mentioned to have switched the resistor $R_X$ to the reference current bus 56 in order to supply the current X to summing circuit 24, is enabled at the commencement of time slot 2 by an impulse supplied to $s(FF_1)$ from the terminal $D_2$ of timing circuit 40. The reset terminal $r(FF_1)$ is not impulsed during time slot 2, since AND gate input lead 60 is disabled.

Now that the output terminals $x(FF_1)$ and $x'(FF_1)$ are respectively in the "1" and "0" states, the input terminals $s(FF_2)$ and $r(FF_2)$ will be respectively in the "0" and "1" states. Thus the state of output terminal $x(FF_2)$ is "0," switch S2 is disabled, and resistor $R_2$ is connected to the open circuit terminal 44.

As in the case of the input terminal $r(FF_1)$, terminal $r(FF_3)$ is in the "0" state since the juncture 105 is disabled. The output terminal $x(FF_3)$ therefore remains in its rest state, i.e., the "0" state, switch S3 remains disabled, and resistor $R_3$ remains connected to ground. Neither of the currents $i_3$ and $i_3$* is therefore supplied by way of $R_3$. Since juncture 105 is presently disabled, the state of flip-flop $FF_4$ remains unchanged and the output terminal $x(FF_4)$ is still in the "0" state. Switch S4 remains connected to its ground terminal and neither of the currents $i_4$ and $i_4$* is supplied by way of resistor $R_4$.

Accordingly, the only current supplied to the summing circuit 24 by way of the reference current lead 26 during time slot 2 of this hypothetical example, is the current X which is equal to negative 2.0 units. The current $i_{in}$, as previously mentioned, is therefore equal to +5.0 units, the output terminal $x(FF_6)$ is in the "1" state, the AND gate 54 is enabled by a concurrence of impulses from terminal $x(FF_6)$ and terminal $D_2$ of timing wave source 40, and the binary digit "1" is supplied to the output terminal 74. The accumulated code at the end of time slot 2 is therefore 11.

During time slot 3, it will be seen that the current $i_3$ equal to negative 2.5 units (see FIG. 3), is added to the current X to increase the reference current $i_{ref}$ to negative 4.5 units. The combination of the message current $i_s$ (7.0 units) and the reference current $i_{ref}$ (negative 4.5 units) in summing circuit 24 yields an amplitude of $i_{in}$ equal to +2.5 units. Input terminal $s(FF_6)$ is therefore still at a positive potential and the states of the output terminals $x(FF_6)$ and $x'(FF_6)$ remain unchanged, i.e. remain respectively "1" and "0." The states of the output terminals $x(FF_5)$ and $x'(FF_5)$ also remain unchanged, since the state of polarity flip-flop $FF_5$ will not be changed until the commencement of the fifth time slot. Therefore, there is not a concurrence of impulses at the respective inputs of either AND gate 50 or AND gate 70. Accordingly, inhibit bus 58 remains disabled.

The state of flip-flop $FF_1$, and therefore the position of switch S1, remain unchanged. The resistor $R_X$ is still connected to the reference current bus 56 and the current X is supplied to the summing circuit input lead 26. So, too, the state of flip-flop $FF_2$ and the position of its associated switch $FF_2$ remain unchanged and, consequently, the shunting resistor $R_2$ is still connected to the open circuit terminal 44.

The input terminal $s(FF_3)$, however, is impulsed at the beginning of time slot 3 by the output termnal $D_3$ of timing wave source 40, so that the output terminal $x(FF_3)$ now assumes the "1" state and enables the switch S3. Enablement of switch S3 connects resistor $R_3$ to the reference current terminal 66 and thence, by way of reference current bus 56 and polarity switch S5, to the negative potential source 49. Since resistor $R_2$ is connected to the open circuit terminal 44 of switch S2, no current supplied by way of resistor $R_3$ is shunted through resistor $R_2$ and, consequently, the current $i_3$ (equal to negative 2.5 units) is added to the current X (equal to negative 2.0 units). The summation of these currents yields a value of $i_{ref}$ equal to negative 4.5 units. The state of flip-flop $FF_4$ is unaltered during time slot 3 and, hence, as was true during time slot 2, no current is supplied by way of resistor $R_4$.

As was previously mentioned, the negative 4.5 units of current represented by $i_{ref}$ are added to the 7.0 units of current represented by the message current $i_s$ to yield a value of $i_{in}$ equal to 2.5 units. The consequent concurrent of impulses from the output terminal $x(FF_6)$ and the terminal $D_3$ of timing wave source 40 enables AND gate 54 and a binary digit "1" is supplied to the output terminal 74. The accumulated code at the end of time slot 3 is therefore 111.

As will be seen from the following discussion of the processes occurring during time slot 4, the value of $i_{in}$ remains positive. The potential of terminal $s(FF_6)$ is therefore positive and the states of output terminals $x(FF_6)$ and $x'(FF_6)$ remain respectively "1" and "0." Since the output terminals $x(FF_5)$ and $x'(FF_5)$ also remain unaltered, neither of the AND gates 50 and 70 is enabled and, consequently, the inhibit bus 58 remains disabled.

Of the flip-flops $FF_1$ to $FF_4$, the only one that will be affected during time slot 4 will be flip-flop $FF_4$. A change of state occurs in flip-flop $FF_4$ by virtue of an impulse supplied to its input terminal $s$ from the terminal $D_4$ of timing wave source 40. The output terminal $x(FF_4)$ then assumes the "1" state, switch S4 is switched to its reference current terminal 95, and current flows through resistor $R_4$ by way of the reference current bus 56 and the negative potential source 49. The current $i_4$, equal to negative 1.25 units (see FIG. 3), is consequently supplied to the reference current lead 26 and added to the pre-existing currents X and $i_3$ to yield a value of $i_{ref}$ equal to negative 5.75 units. The negative 5.75 units of $i_{ref}$ are combined with the 7.0 units of $i_s$ in summing circuit 24 to yield a value of $i_{in}$ equal to 1.25 units.

The AND gate 54 is thus enabled by a concurrence of impulses from the output terminal $x(FF_6)$ and the terminal $D_4$ of timing wave source 40, and a binary digit "1" is supplied to the output terminal 74. The accumulated code at the end of time slot 4 is therefore 1111. This completes the coding process for the hypothetical example of +7.0 units of message current $i_s$.

During time slot 5 the encoder will be prepared for the next coding process. The input terminal $s(FF_6)$ is no longer positive since the message current $i_s$ goes to zero and the reference current $i_{ref}$ is discontinued. The reference current $i_{ref}$ ceases, since an impulse is supplied to each of the terminals $r(FF_1)$, $r(FF_3)$, and $r(FF_4)$ from the terminal $D_5$ of timing wave source 40. Accordingly, each of the named flip-flops changes state so that its $x$ output terminal is the "0" state and its associated switch returns to its ground position. At the same time an impulse is supplied to terminal $r(FF_2)$ by way of terminal $x'(FF_1)$. The output terminal $x(FF_2)$ thereby assumes the "1" state, switch S2 is enabled and resistor $R_2$ is connected to ground. Also, during time slot 5, the polarity flip-flop $FF_5$ undergoes a change of state by virtue of an impulse supplied to its $r$ input terminal from the terminal $D_5$ of timing wave source 40. The states of the $x$ and $x'$ output terminals of each of the flip-flops $FF_1$ and $FF_3$ to $FF_6$ are therefore respectively "0" and "1" immediately preceding the commencement of the next following frame. The states of terminals $x(FF_2)$ and $x'(FF_2)$, on the other hand, are respectively "1" and "0" at this time.

*Hypothetical case II*

As a concluding example of the operation of the illustrative piecewise-linear encoder of FIG. 1, it will be assumed that at the commencement of the first time slot of frame three of FIG. 2 the value of the message current $i_s$ is negative 1.5 units of analog current amplitude. The behavior of waveforms (1) to (20) of FIG. 2 during frame three is pictorially representative of the operations now to be discussed.

As in the previous example, during the first time slot no reference current $i_{ref}$ is fed into the summing circuit 24. Consequently, the current $i_{in}$ is representative of the message current $i_s$ only, and, for this hypothetical example, will be negative.

It has been assumed throughout the specification that no phase reversal occurs in the amplifier 28, though, needless to say, this assumption is not necessary. Refer to table 72: since the current $i_{in}$ is negative, the potential at $s(FF_6)$ is negative and the states of terminals $x(FF_6)$ and $x'(FF_6)$ are respectively "0" and "1." Until the expiration of the delay in circuit 82, the polarity flip-flop $FF_5$ will remain in the rest state it assumed during time slot 5 of the next previous frame. Thus the respective states of the output terminals $x(FF_5)$ and $x'(FF_5)$ are also "0" and "1" at this time. Neither of the AND gates 50 and 70 is therefore enabled since there is not a concurrence of the necessary input pulses at either of these AND gates. Inhibit bus 58 is consequently disabled.

Since the state of output terminal $x'(FF_5)$ is at rest, i.e., is a "1," the switch S5 is also at rest and, consequently, is switched to the positive reference potential source 48. That the positive source 48 is connected to the reference current bus 56 at this time is of no consequence because all of the switches S1, S3 and S4 are disconnected from their reference current terminals. So, too, it is of no consequence, as was previously mentioned, that at this time resistor $R_2$ is shunted to ground, since no reference current is thereby diverted.

AND gate 54 is disabled since terminal $x(FF_6)$ is in the "0" state and, consequently, there is not a concurrence of impulses from the terminal $x(FF_6)$ and the terminal $D_1$ of timing wave source 40. The binary digit "0" therefore appears at the output terminal 74 and constitutes the first element of the code group to be generated. Since the digit "0" is the most significant digit of this code group, it indicates that the message current $i_s$ is negative in polarity.

It will be noted that the portion of the encoding characteristic, which relates to the process occurring in response to the hypothetical message current of value negative 1.5 units, is the segment 91 of FIG. 4, which segment is only partially shown.

Immediately preceding the commencement of time slot 2, the delay circuit 82 supplies an impulse to AND gate 32; but this is of no avail since the output terminal $x(FF_6)$ is in the "0" state at this time. Consequently, AND gate 32 is not enabled and the polarity flip-flop $FF_5$ remains in its rest state. This sequence of events determines that the reference current needed in the trial and error approximation of the message current $i_s$ must be of positive polarity. In response to this determination, the switch S5 remains in its rest state. The reference current bus 56 is, accordingly, appropriately connected to the positive reference potential source 48.

The input terminal $s(FF_1)$ is impulsed at this time by the terminal $D_2$ of timing wave source 40. The output terminals $x(FF_1)$ and $x'(FF_1)$ are changed from their rest states and are now respectively in the "1" and "0" states. The switch S1 is therefore enabled and is switched to its reference current terminal 42. The current X (of value +2 units) then flows through resistor $R_X$. When $x(FF_1)$ was switched from the "0" state to the "1" state, the input terminal $r(FF_2)$ was impulsed. The output terminal $x(FF_2)$ was thereby changed from the "1" to the "0" state and switch S2 was disabled, in turn causing shunting resistor $R_2$ to be connected to the open circuit terminal 44. Since the reference current $i_{ref}$, consisting solely now of the current X, has a value of +2 units, when it is combined with the message current $i_s$, the resultant current $i_{in}$ will have a value of +0.5 unit. The input terminal $s(FF_6)$ will therefore be at a positive potential so that the output terminals $x(FF_6)$ and $x'(FF_6)$ will change state, assuming the "1" and "0" states respectively. At this point in time it is too late, as has already been seen, to enable AND gate 32, since the impulse now available at terminal $x(FF_6)$ does not concur with the impulse previously supplied by delay circuit 82. The state of polarity flip-flop $FF_5$ therefore remains unaltered.

Since there is a concurrence of impulses from the output terminal $x(FF_6)$ and the terminal $D_2$ of timing wave source 40, AND gate 54 is now enabled and it accordingly supplies an impulse, i.e., binary digit "1," to the output terminal 74. The accumulated code at this time is therefore 01.

It will be recalled that codes representing negative values of the message current $i_s$ are here "primes" of codes representing corresponding positive values of the current $i_s$. Thus, the present accumulated code 01 means that the encoder has up to now determined that the message current $i_s$ is (1) negative, and (2) is less in absolute magnitude than 4.0 code units, or, considering the scale factor of two and expressing the code units in analog units, is less in absolute magnitude than 2.0 analog units.

During time slot 3, the following operations take place: The switch S1 is immediately disabled so that the flow of current X may be discontinued. This is necessary because, as has been seen, it was determined that the absolute magnitude of the current X (2.0 units) was greater than the absolute magnitude of the message current $i_s$ (1.5 units), which discrepancy causes the current $i_{in}$ to become positive by 0.5 unit.

The switch S1 is disabled as follows: At the commencement of time slot 3 there is a concurrence of impulses at the inputs of AND gate 62 from the terminal $D_3$ of timing wave source 40 and from the inhibit bus 61. Notice that the present inhibitive state of bus 61 is due to the postponement of the inhibitive state of bus 58 by delay circuit 59. It will be recalled that the output terminal $x(FF_6)$ was changed to the "1" state when the current $i_{in}$ became positive during time slot 2. The impulse thus supplied by the terminal $x(FF_6)$ in concert with the impulse supplied by the output terminal $x'(FF_5)$ enabled the AND gate 50, the OR gate 52, and finally the inhibit bus 58. Delay circuit 59 thereupon proceeded to delay the inhibitive effect of bus 58. Thus there is a concurrence of impulses at the AND gate 62 at the commencement of time slot 3, AND gate 62 is enabled as is OR gate 64 and, finally, the input terminal $r(FF_1)$ is impulsed causing flip-flop $FF_1$ to change state. This change of state causes the output terminal $x(FF_1)$ to revert to its "0" state, thereby disabling the switch S1.

The impulsing of the input terminal $r(FF_1)$ also causes the output terminal $x'(FF_1)$ to assume the "1" state, thereby changing the state of flip-flop $FF_2$ by way of its input terminal $s$. The result is that the output terminal $x(FF_2)$ is now in the "1" state, the switch S2 is enabled and the shunting resistor $R_2$ is connected to ground. As will be seen very shortly, reference current supplied by way of resistor $R_3$ will be partially diverted to ground via the shunting resistor $R_2$.

At the same time that the input 60 of AND gate 62 is impulsed by the terminal $D_3$ of timing wave source 40, the input terminal $s(FF_3)$ is also impulsed, causing the output terminal $x(FF_3)$ to assume the "1" state and the switch S3 to be switched to its reference current terminal 66. Reference current from the source 48 now finds a path by way of reference current bus 56 through the resistor $R_3$. Some of this current, as was previously mentioned, will be diverted to ground by way of shunting resistor $R_2$. What remains of this current will be the current $i_3^*$ (having, here, a value of 1.0 unit) and this remainder will constitute the reference current $i_{ref}$.

Upon summing the current $i_3^*$ and the message current $i_s$ in summing circuit 24, the resultant current $i_{in}$ is found to have a value of negative 0.50 unit. The input terminal $s(FF_6)$ is, therefore, at a negative potential and the states of output terminals $x(FF_6)$ and $x'(FF_6)$ are respectively "0" and "1." Although an impulse is supplied to the input 102 of AND gate 54 by the terminal $D_3$ of timing wave source 40, none is supplied to the input 104 by the terminal $x(FF_6)$, since the latter terminal is now in the "0" state. Accordingly, AND gate 54 is disabled and the binary digit "0" is supplied to the output terminal 74. The accumulated code at the end of time slot 3 is therefore 010, which accumulation indicates that the absolute code value which will be used to represent the message current $i_s$ is less than 4.0 but greater than or equal to 2.0 code units. This should not be confusing, as it will be recalled that the scale factor of the segment 91 of the piecewise-linear characteristic of FIG. 4 is 2 to 1. Thus, when speaking in terms of code values, it is said that the absolute code value is less than 4.0 but greater than or equal to 2.0 code units, it should be understood that this is equivalent to saying that the absolute magnitude of the message current $i_s$ is less than 2.0 but greater than or equal to 1.0 unit of analog current amplitude.

Since the respective states of the terminals $x(FF_6)$, $x'(FF_6)$, $x(FF_5)$, and $x'(FF_5)$ were "0," "1," "0," and "1," at the termination of time slot 3, neither of the AND gates 50 and 70 was enabled. Thus, inhibit bus 58 was disabled. At the commencement of time slot 4, therefore, inhibit bus 61 is also disabled. Accordingly, when an impulse is supplied to junction 104 by the terminal $D_4$ of timing wave source 40, AND gate 84 will continue in its diasabled state, since no impulse is simultaneously supplied by bus 61. The input terminal $s(FF_4)$, however, will be impulsed, causing the state of output terminal $x(FF_4)$ to become a "1" and ultimately causing the resistor $R_4$ to be connected to the reference current bus 56, since switch S4 is enabled and switched to its reference current terminal 95.

During this time the state of flip-flop $FF_2$ has remained unchanged so that the shunting resistor $R_2$ is still connected to ground. Accordingly, the current supplied by way of resistor $R_4$ to the junction 100, will be partly diverted to ground by way of shunting resistor $R_2$ and partly supplied by way of the series resistor $R_1$ to the summing circuit reference current lead 26. That part of the current flowing through $R_4$ which is not diverted to ground by way of shunting resistor $R_2$ is here denoted as the current $i_4^*$ and, for the sake of illustration, is given the value of 0.5 unit in FIG. 3. The reference current $i_{ref}$ therefore now consists of the components $i_3^*$ and $i_4^*$ and has a value of +1.5 units of analog current amplitude. When this value of reference current $i_{ref}$ is combined with the negative 1.5 units of the message current $i_s$, the resultant current $i_{in}$ is zero.

During time slot 4 the inputs 102 and 104 of AND gate 54 were not concurrently impulsed since the state of output terminal $x(FF_6)$ was a "0." Therefore, AND gate 54 remains disabled and the binary digit "0" appears at the output terminal 74. The accumulated code at this point in time is consequently 0100 and stand for a code value of negative 3.0 code units, i.e., $-(0+2^1+2^0)$. As stated above, this code value corresponds to the negative 1.5 analog current units of message current $i_s$. This correspondency is due to the scale factor two of the third quadrant's first segment, segment 91 (not fully shown) of the piecewise-linear characteristic of FIG. 4.

As in the previous illustrative example, where the message current $i_s$ had a magnitude of +7.0 units of analog current amplitude, the fifth time slot is used to "clear out" the encoder. The clearing out process involves the resetting of flip-flops $FF_1$ to $FF_5$ and ensures that at the commencement of the first time slot of the next succeeding frame or code group, the output terminals $x$ and $x'$ of these flip-flops circuits will be respectively in the "0" and "1" states. This resetting of the flip-flop circuits in turn ensures that the switch S5 is connected to the positive source of reference potential 48 (as shown) and that the switches S1 to S4 connect their associated resistors to ground (as shown).

Figure 5:
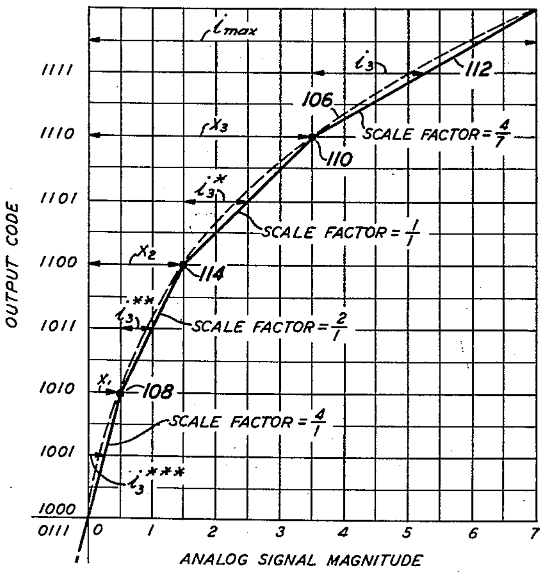
FIG. 5 illustrates a representative piecewise-linear encoding characteristic having more than one breakpoint in order to more closely approximate a given nonlinear function.
Figure 6:
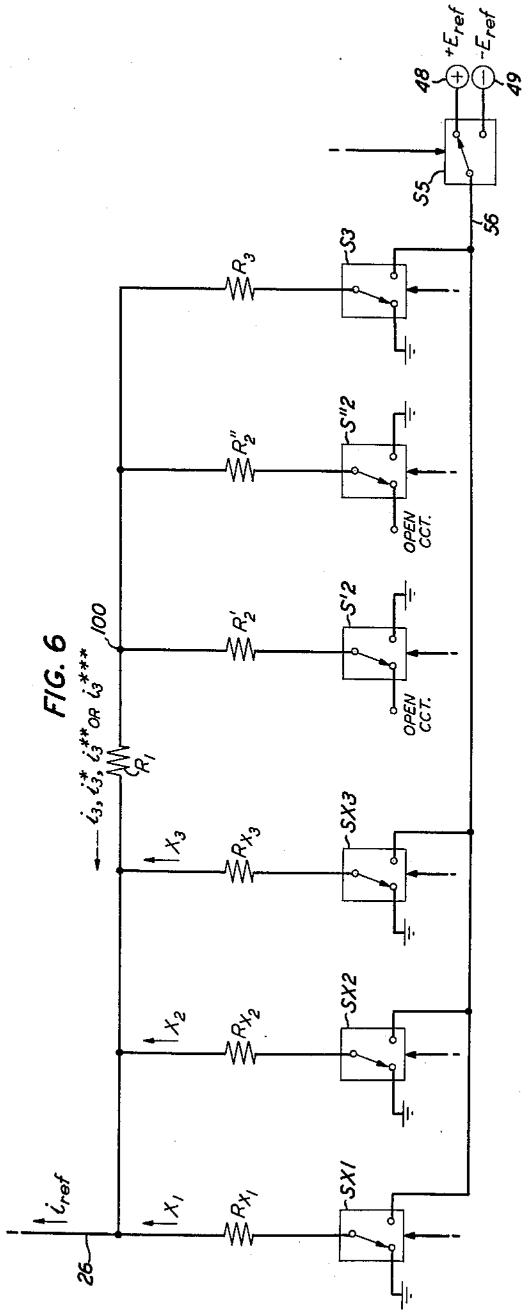
FIG. 6 is a partial schematic circuit which shows the manner in which the piecewise linearity of the characteristic of FIG. 5 may be achieved.
Figure 6A:
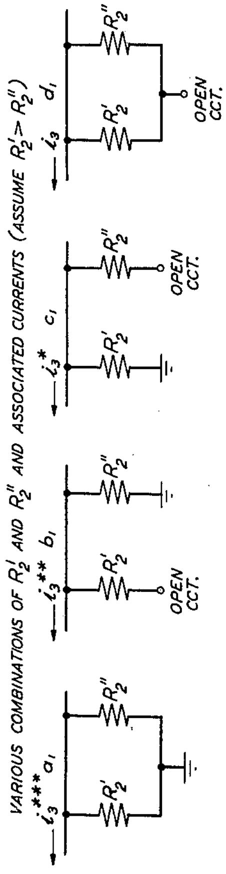
FIG. 6A is a partial schematic circuit showing the various possible combinations and associated currents of the shunting resistors $R_2'$ and $R_2''$ of FIG. 6.

*FIGURES 5, 6, and 6A*

FIG. 5 has been included merely to show one of the many types of piecewise-linear encoding characteristics which may be obtained in accordance with the invention. The encoding characteristic of FIG. 5 has three breakpoints determined by the arbitrarily chosen currents $X_1$, $X_2$ and $X_3$. These breakpoints, which have been chosen for illustration, approximate the straightforward nonlinear characteristic 106. It will be noted in FIG. 5 that a mere 4-digit code is used and therefore that each segment of the characteristic is divided into only two equal portions. It will be recalled that in FIG. 4, where a single breakpoint was used in conjunction with a 4-digit code, that each segment of the characteristic was broken up into four equal portions.

Once the currents $X_1$, $X_2$ and $X_3$ have been chosen, the currents $i_3$, $i_3^*$, $i_3^{}$, and $i_3^{*}$ are chosen to bisect their respective segments. The following relationships are therefore required if the illustrative piecewise-linear characteristic of FIG. 5 is to be obtained:

$$\frac{i_3}{i_3^*}=\frac{i_{max.}-X_3}{X_3-X_2}$$

$$\frac{i_3^*}{i_3^{**}}=\frac{X_3-X_2}{X_2-X_1}$$

and $$\frac{i_3^{}}{i_3^{*}}=\frac{X_2-X_1}{X_1}$$

Note that the last expression applies equally well to the embodiment of FIG. 1, in that it also defines the relationship between the binarily related currents of two adjacent subranges of a piecewise-linear characteristic having only one breakpoint per quadrant.

As was mentioned in the case of the simple bisegmental piecewise-linear characteristic of FIG. 4, it should be understood that it was not necessary that the characteristic be symmetrically broken in any quadrant. Thus, for example, the first breakpoint 108 of FIG. 5 need not necessarily occur at the transition of the third most significant digit of the code. It can be chosen to occur at any desired transition. It could, for example, be chosen to occur at the transition of the second most significant digit of the code, i.e., at the point where the second most significant digit of the code undergoes a transition from "0" to "1".

FIG. 6 has been included merely to show one possible way of achieving the piecewise-linear characteristic of FIG. 5.

Instead of the single resistor $R_X$ of FIG. 1, three resistors $R_{X1}$, $R_{X2}$, and $R_{X3}$ have been used in the circuit of FIG. 6. The values of the resistors $R_{X1}$, $R_{X2}$, and $R_{X3}$ are chosen to supply the currents $X_1$, $X_2$ and $X_3$, respectively, to the reference current lead 26. These resistors may be switched to the reference current bus 56 by their respective switches SX1, SX2 and SX3 in any number of ways. Note that the switch-enabling logic and flip-flop circuits, fully shown in FIG. 1, are not shown in FIG. 6. These circuits may be arranged in accordance with the teachings inherent in the illustrative embodiment of FIG. 1.

In FIG. 5 each breakpoint is shown to be determined by a single current rather than a combination of currents. Thus, for example, the breakpoint 110 is determined, not by a summation of the currents $X_1$, $X_2$ and what would be $(X_3-X_2)$, but rather by a single current $X_3$. This method of approximating the breakpoints is perhaps more accurate than would be the method using the combination of currents mentioned above, in view of the possibility of cumulative error inherent in the latter method. Thus, in accordance with the first method—i.e., the method of determining each breakpoint by an individual current—if for example, it were necessary to operate within the range determined by segment 112, the current $X_3$ would be supplied to the reference current lead 26 to the exclusion of currents $X_1$ and $X_2$. In FIG. 6 this would necessitate the connection of resistors $R_{X1}$ and $R_{X2}$ to ground by their respective switches SX1 and SX2, and the connection of resistor $R_{X3}$ to the reference current bus 56 by its associated switch SX3. The various combinations of the currents $X_1$, $X_2$ and $X_3$, which would be used in the second method discussed above, i.e., the method by which these currents would be used in combination to establish the breakpoints 110 and 114 of FIG. 5, should be apparent and in need of no further explanation.

The serial resistor $R_1$ of FIG. 6 serves the same purpose as does resistor $R_1$ of FIG. 1. Also, the function of the shunting resistors $R_2'$ and $R_2''$ is similar to that of shunting resistor $R_2$ of FIG. 1.

Refer to FIG. 6A, in which it is assumed for the sake of illustration that $R_2'$ is of greater magnitude than is $R_2''$. Various combinations of these shunting resistors can be used to establish the changes in scale factor of FIG. 5.

For example, assume that resistor $R_3$ is connected to the reference current bus 56 by switch S3 so that reference current is fed to juncture 100. When the resistor $R_2''$ is connected to ground by the switch S''2 and the resistor $R_2'$ is connected to the open circuit terminal of switch S'2, the current $i_3^{}$ will be supplied to the reference current lead 26. When, however, the resistor $R_2'$ is connected to the ground terminal of switch S'2 and the resistor $R_2''$ is connected to the open circuit terminal of switch S''2**, the current $i_3^*$ will be supplied to reference current lead 26. When both of the resistor $R_2'$ and $R_2''$ are connected to ground by their respective switches, the current supplied to the reference current lead 26 by way of the serial resistor $R_1$ will be $i_3^{*}$. Finally, when each of resistors $R_2'$ and $R_2''$ is connected to its respective open circuit connection, then the current $i_3$ will be supplied to reference current lead 26** by way of resistor $R_1$.

In the foregoing description, the invention has been illustrated by apparatus for converting analog information to a binary code. The invention may be extended in a straightforward manner to apparatus for translating to or from a permutation code of any base *b*. Thus, for example, in the case of the ternary code in which the base is 3 and each digit position may contain a pulse having any one of three coefficient values, viz., 0, 1 or 2, the binarily related resistors of the reference current circuit 99 of FIG. 1 could be reproportioned so that the various sums of any number of them taken in succession from a reference value are proportional to the successive integral powers of 3.

It should be understood, therefore, that the above described arrangements are illustrative of the application of the principles of the invention. Numerous other arrangements may be devised by those skilled in the art without departing from the spirit and scope of the invention.

What is claimed is:

1. In a system, at one point of which amplitude samples of analog signals are, throughout the over-all dynamic range of said signals, transformed nonlinearly to groups of pulses arranged in accordance with a permutation code of base *b*, nonlinearly meaning that said code does not vary in direct proportion to said input samples, and at another point of which said groups of pulses are nonlinearly transformed to reconstitute their original analog form, apparatus to perform said over-all nonlinear transformations on a piecewise-linear basis which comprises means to change the relationship between said amplitude samples and said permutation code at predetermined transitions in the permutation of said code, and means to linearly transform said amplitude samples to said code and said code to said reconstituted samples only between said predetermined transitions in the permutation of said code, linearly meaning that said amplitude samples and said code, as well as said code and said reconstituted samples, vary in direct proportion to one another, respectively, only between said predetermined transitions in said code, the over-all relationship between said samples and said code being nonlinear.

2. A system in accordance with claim 1 in which a preassigned element of said code indicates, in each of said pulse groups, the polarity of the amplitude sample associated with the particular pulse group, means to determine the polarity of each of said amplitude samples and to generate corresponding polarity-indicating code elements at said one points of the system, and means to determine the polarity of said elements and to establish the polarity of said reconstituted amplitude samples at said other point of the system.

3. A system in accordance with claim 1 wherein said means to linearly transform said amplitude samples to said permutation code between said predetermined transitions in the permutation of said code comprises means to generate reference signals; and means to compare additively said reference signals with said amplitude samples.

4. A system in accordance with claim 3 wherein said means to change the relationship between said amplitude samples and said permutation code comprises means to effect a corresponding change in the magnitude of said reference signals.

5. A system in accordance with claim 1 in which said permutation code is of the base 2, i.e., the binary code, and means to effect said transformation between said permutation code and said amplitude samples in binary fashion.

6. A system in accordance with claim 5 in which the most significant digit of said binary code is, in each pulse code group, the polarity-indicating digit, and means to generate said most significant digit in response to the polarity of the analog signals initiated at said one point of the system.

7. In a system, at one point of which amplitude samples of analog signals are transformed nonlinearly to groups of pulses arranged in accordance with the binary code and at another point of which said groups of pulses are non-linearly transformed to reconstitute their original analog form: means to linearly transform said amplitude samples to said binary code at said one point of the system and said binary code to said reconstituted samples at said other point of the system between predetermined transitions in the permutation of said binary code, comprising a timing wave source having a plurality of output terminals related in number to the number of digits in said binary code, a reference current network to generate reference current of appropriate magnitude and polarity in response to each of said amplitude samples, a summing network to sum algebraically said reference currents and their associated amplitude samples, means to supply said amplitude samples and said reference currents to said summing network; decision circuit means responsive to the algebraic sum of each of said associated amplitude samples and reference currents to control the generation of said reference currents, means to convey said algebraic sum to the input of said decision circuit, said decision circuit having an *x* output terminal which assumes either of the binary states "0" and "1," depending upon the polarity of said algebraic sum, and an *x'* output terminal, the binary state of which is the prime of the state of said *x* output terminal; means responsive to a binary impulse supplied thereto from said *x* output terminal of said decision circuit, and a simultaneous timing impulse supplied by said timing wave source to said last-named means immediately before the commencement of the second most significant digit of said binary code, to determine the polarity of said amplitude samples, said last-named means including a bistable circuit also having *x* and *x'* output terminals, whose respective binary states are dependent upon whether or not said timing impulse and said binary impulse from said *x* output terminal of said decision circuit are simultaneously supplied to said polarity determining means, and a two-position polarity switch, one position of which is connected to a negative source of reference potential and the other position of which is connected to a positive source of reference potential, the output of said polarity switch being connected via said reference current circuit to said means to supply said reference current to said summing network; and means to perform said nonlinear transformations between said binary code and said amplitude samples on a piecewise-linear basis which comprises means to change the scale factor between said binary code and said amplitude samples at predetermined transitions in the permutation of said code.

8. A system in accordance with claim 7 in which said reference network comprises: a plurality of two-position switches each having an output and a pair of inputs corresponding to said two positions, one of said inputs being connected to a point of reference potential, and the other of said inputs being connected to the output of said polarity switch; a plurality of binary-weighted resistors corresponding in number to said plurality of two-position switches, one end of each of which is connected to the output of an associated one of said plurality of two-position switches and the other end of each of which is connected to a common juncture; a plurality of scale-factor-changing, two-position switches each having an output and a pair of inputs corresponding to said two positions, one of said inputs of each of said scale-factor-changing switches being connected to said point of reference potential and the other of said inputs being connected to an open circuit terminal, a plurality of shunting resistors corresponding in number to said plurality of scale-factor-changing switches, one end of each of said shunting resistors being connected to the output of said last-named switches and the other end of each of said shunting resistors being connected to said common juncture; a plurality of switches associated with a corresponding number of resistors to determine the loci of breakpoints in the coding characteristic defined by the relationship between said binary code and said amplitude samples, said breakpoints occurring at said predetermined transitions in the permutation of said binary code, each of said last-named switches being a two-position switch having an output and a pair of inputs corresponding to said two positions, one of said inputs of each of said last-named switches being connected to said point of reference potential and the other of said inputs being connected to the output of said polarity switch, one end of each of said breakpoint-determining resistors being connected to the output of an associated one of said last-named switches, the other end being connected to said means to supply said reference currents to said summing network; and means to connect said common juncture to said other ends of said breakpoint-determining resistors.

9. In a system that uses signals in analog form comprising amplitude samples at one point and, at another point, uses signals in digital form comprising groups of pulses arranged in accordance with a permutation code of base *b*, each of said pulse groups having substantially the same information content as an associated one of said amplitude samples, the relationship between said signal forms defining a pulse code versus amplitude sample characteristic, apparatus for effecting an over-all nonlinear translation on a piecewise-linear basis from one of said forms into the other form without alteration of said information content, which comprises means to change the slope of said characteristic at predetermined transitions in the permutation of said permuted code, and means to render said relationship between said pulse code and said amplitude samples a linear one only between said predetermined transitions in said code, said linear relationship meaning that said code and said samples vary in direct proportion to each other only between said predetermined transitions in said code, the over-all relationship between said code and said samples being nonlinear and said pulse code versus amplitude sample characteristic thus being piecewise-linear.

10. An encoder to transform amplitude samples of current to binary code nonlinearly on a piecewise-linear basis, comprising means to establish a relation between said code and said current samples defining a piecewise-linear characteristic consisting of a plurality of segments and at least one breakpoint per quadrant; means to generate current defining and extending to each breakpoint of said characteristic; means to encode said amplitude samples linearly within each segmental range of the current axis of said piecewise-linear characteristic; and means to change said relation between said amplitude samples and said code only as the operation of the encoder proceeds from one segmental range to another, so that said code and said amplitude samples vary in a unique direct proportion to each other within each segmental range.

11. An encoder to transform amplitude samples of current supplied thereto to binary code nonlinearly on a piecewise-linear basis, comprising means to establish a relation between said supplied amplitude samples and said code defining a piecewise-linear characteristic having at least one breakpoint per quadrant, said characteristic having a plurality of segments per quadrant greater in number by one than the number of breakpoints per quadrant, each of said segments encompassing a predetermined portion of the current axis of said piecewise-linear characteristic, means to generate currents defining and extending to each breakpoint of said characteristic, means to generate additional current to divide the respective portion of the current axis encompassed by each of said segments binarily in accordance with the number of elements in said code, means to change said relation between said amplitude samples and said code only as the operation of said encoder proceeds from one segment to another, means to compare successively with each of said amplitude samples said breakpoint-determining current and said additional currents, means responsive to each of said successive comparisons to determine which of said breakpoint-determining and said additional currents are to be used in the immediately succeeding comparison, and means also responsive to each of said comparisons to generate a code element corresponding to the result of the comparison.

12. An encoder to transform to binary code, nonlinearly on a piecewise-linear basis, amplitude samples of current supplied to the encoder and ranging in absolute magnitude from zero to $i_{max}$, comprising means to establish a relation between said samples and said code defining a symmetrical piecewise-linear characteristic having one breakpoint and two segments per quadrant, each of said segments being defined by the breakpoint occurring within its quadrant and each encompassing a predetermined portion of the current axis of said piecewise-linear characteristic, means to generate a current to determine said breakpoint in each quadrant and having an absolute value of X, the first segment extending from the origin of each quadrant to its associated breakpoint thereby encompassing X units of said current axis, and the second segment extending from said breakpoint thereby encompassing $i_{max}-X$ units of said current axis, means to change the relation between said amplitude samples of said code only as the operation of said encoder proceeds from one segment to another, and means to encode each of said amplitude samples linearly within the compass of each of the segments of said piecewise-linear characteristic.

13. An encoder to transform amplitude samples of current to binary code nonlinearly on a piecewise-linear basis comprising means to establish a relation between said code and said samples of current defining a piecewise-linear characteristic consisting of a plurality of segments and a plurality of breakpoints, less in number by one than said plurality of segments and determining the extent of each of said segments, means to generate a plurality of breakpoint-determining currents, means to encode said amplitude samples linearly within each segmental range of the current axis of said piecewise-linear characteristic, and means to change said relation between said amplitude samples and said code only as the operation of said encoder proceeds from one segmental range to another, so that said code and said amplitude samples vary in a unique direct proportion to each other within each segmental range.

14. An encoder in accordance with claim 13 and means to additively combine various combinations of said breakpoint-determining currents to define each breakpoint of said piecewise-linear characteristic.

15. An encoder in accordance with claim 13 and means to determine each breakpoint of said piecewise-linear characteristic by an individual one of said breakpoint-determining currents, each of said currents thereby extending the entire range from the origin along the current axis of said piecewise-linear characteristic to define its associated breakpoint.

16. A coding circuit for nonlinearly converting an amplitude sample of a current wave of prescribed amplitude range into binary code on a piecewise-linear basis which comprises means to generate a sequence of periodically recurrent timing pulses; means responsive to the first pulse of said sequence and to the polarity of said sample to generate the most significant digit of said code; means responsive to the second pulse of said sequence and to said most significant digit to develop a first reference current of predetermined magnitude and of polarity opposite to that of said sample; means to sum algebraically in a first summation said sample and said first reference current and also, at the time of each pulse remaining in said sequence, said sample and all reference currents extant at each of said times; means responsive to the polarity of said first summation and to said second pulse to generate the second most significant digit of said code; means also responsive to the polarity of said first summation and, in addition, to the third pulse of said sequence to terminate the generation of said first reference current only if the polarity of said first summation is opposite to that of said sample; means responsive to the third pulse of said sequence and to said second most significant digit to generate a second reference current of magnitude equal to one-half that of said first reference current if said first reference current has been terminated or to one-half the difference between a predetermined portion of said prescribed amplitude range and said first reference current if the latter current continues to be generated; and means responsive to each following pulse of said sequence and to each following significant digit to generate further reference currents in the manner by which said foregoing reference currents were generated.

References Cited in the file of this patent

UNITED STATES PATENTS

| | | |
|---|---|---|
| 2,531,846 | Goodall | Nov. 28, 1950 |
| 2,592,308 | Meacham | Apr. 8, 1952 |
| 2,641,740 | Levy | June 9, 1953 |
| 2,660,618 | Aigrain | Nov. 24, 1953 |
| 2,795,650 | Levine | June 11, 1957 |
| 2,839,744 | Slocomb | June 17, 1958 |
| 2,841,649 | Boisvieux | July 1, 1958 |
| 2,889,409 | Carbrey | June 2, 1959 |